United States Patent [19]

Waite et al.

[11] Patent Number: 4,652,794

[45] Date of Patent: Mar. 24, 1987

[54] ELECTROLUMINESCENT DEVICE HAVING A RESISTIVE BACKING LAYER

[75] Inventors: Michael S. Waite, Kent; John L. Williams; John R. Siddle, both of London, all of England

[73] Assignee: National Research Development Corporation, London, England

[21] Appl. No.: 558,526

[22] Filed: Dec. 6, 1983

[30] Foreign Application Priority Data

Dec. 10, 1982 [GB] United Kingdom ............... 82 35221

[51] Int. Cl.[4] ......................... H05B 33/14; C03C 3/32

[52] U.S. Cl. .................................... 313/509; 313/506; 501/40

[58] Field of Search ................................ 313/502-503, 313/505-506, 509; 501/40

[56] References Cited

U.S. PATENT DOCUMENTS

| | | | |
|---|---|---|---|
| 3,085,175 | 3/1963 | Thornton, Jr. | 313/503 X |
| 3,360,649 | 12/1967 | Brau et al. | 501/40 X |
| 3,560,784 | 2/1971 | Steele et al. | 313/441 |
| 3,627,573 | 12/1971 | Schottmiller et al. | 501/40 X |
| 4,326,007 | 4/1982 | Williams et al. | 313/509 X |
| 4,369,393 | 1/1983 | Frame | 313/506 |
| 4,439,464 | 3/1984 | Lauks | 501/40 X |
| 4,455,506 | 6/1984 | Ayyagari et al. | 313/506 |

FOREIGN PATENT DOCUMENTS 1380417 1/1975 United Kingdom .

*Primary Examiner*—Palmer C. DeMeo
*Assistant Examiner*—Sandra L. O'Shea
*Attorney, Agent, or Firm*—Cushman, Darby & Cushman

[57] ABSTRACT

An electroluminescent device has an active electroluminescent layer 3 backed by a resistive layer 4 formed of an amorphous chalcogenide glass. The amorphous chalcogenide glass may comprise germanium, arsenic and/or antimony and selenium. The device comprises a glass base 1 on which there is supported a patterned transparent electrically conducting layer 2, the active luminescent layer 3, the amorphous chalcogenide glass backing layer 4, an optional dielectric layer 5 and an electrode 6. When an operating voltage is applied between layer 2 and electrode 6 the pattern in layer 2 becomes visible through base layer 1 and the contrast of the pattern is enhanced by the dark background produced by the backing layer 4.

3 Claims, 2 Drawing Figures

ELECTROLUMINESCENT DEVICE HAVING A RESISTIVE BACKING LAYER

This invention relates to electroluminescent devices. Such devices incorporate an active electroluminescent layer which may comprise zinc sulphide, zinc selenide or cadmium sulphide or combinations of those compounds which are doped with manganese or other suitable dopant. The layer may be energised by ac or by pulsed or continuous dc excitation.

One of the problems associated with electroluminescent devices is that the active layer is subjected to a high electric field in order to produce avalanche breakdown and luminescence, and this will result in electrical instability if no control layer is present. This problem is particularly acute with dc excited devices in which high dc voltages may be applied.

It is an object of the invention to provide an electroluminescent device which will remain electrically stable under conditions where avalanche breakdown of the luminescent layer occurs.

According to the invention an electroluminescent device comprises an active electroluminescent layer having at one surface thereof a transparent electrically conducting layer and at the other surface thereof a resistive backing layer formed of an amorphous chalcogenide glass, and an electrode coupled to the backing layer.

An amorphous chalcogenide is a material lacking the long range periodic lattice structure characteristic of a crystal and with a composition that can be varied over a wide range with only a small change in the local environment of the atoms and in the bulk properties. The material contains no less than 30 atom percent of a chalcogen (S, Se and/or Te), whilst the other elements comprise one or more of the following:

Group IIIA (Ga, In, Tl)
Group IIIB (Y, Lanthanides from La to Lu)
Group IV (Si, Ge, Sn, Pb)
Group V (As, Sb, Bi).

Transition metals, for example, Cu, Zn, Ag, Au, Ni, may be present, but at less than 50 atom percent.

The material may be prepared by fusion of the elements, evaporation, sputtering using conventional techniques, deposition from the vapour phase or by chemical reaction.

In carrying out the invention a third layer may be provided between the backing layer and the electrode to provide additional stability and such third layer may comprise yttrium oxide or gallium oxide.

The transparent electrically conductive layer may be supported on a transparent glass base through which the device is viewed. A suitable material for the conductive layer is a tin oxide glass.

Figure 1:
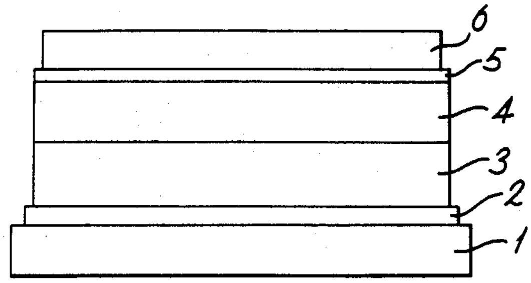
Figure 2:
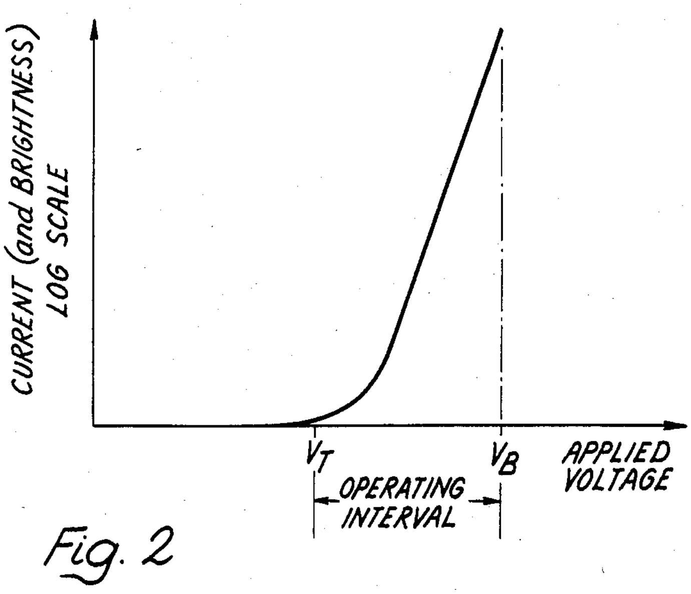

In order that the invention may be more fully understood reference will now be made to the accompanying drawing in which:

FIG. 1 is a side view of an electroluminescent device embodying the invention, and FIG. 2 is a curve showing the relationship between applied voltage and brightness.

Referring now to FIG. 1 there is shown therein an electroluminescent device supported on a transparent glass base 1. On base 1 there is laid down a layer 2 of electrically conducting glass, for example tin oxide. Layer 2 is shaped to form an appropriate pattern which it is desired to be illuminated when the device is energized. An electroluminescent layer 3 which may comprise zinc sulphide doped with manganese is deposited on layer 2 by evaporation, layer 2 is heated to around 150°-200° C. for this purpose. After deposition electroluminescent layer 3 is annealed at 300°-500° C. A suitable thickness for layer 3 is in the region of 0.3-2.0 um. A layer 4 of an amorphous chalcogenide glass is then deposited on to layer 3. Deposition may be by evaporation or any other suitable technique. The thickness of layer 4 is between 1-2 um.

Examples of suitable compositions for layer 4 are the following:

$Ge_{33}As_{12}Se_{55}$
$Ge_{13}As_{10}Sb_{10}Se_{67}$
$Ge_{20}Sb_{30}Se_{50}$
$Ge_{10}Sb_{20}Se_{70}$
$In_{20}As_{20}Se_{60}$
$In_{10}As_{30}Se_{60}$
$Ge_{30}Pb_{20}Se_{50}$

Of the above, glass compositions comprising germanium, arsenic and/or antimony, and selenium, and especially germanium, antimony, and selenium are particularly useful.

Optionally a layer 5 of a dielectric, for example yttrium oxide, is then deposited on layer 4. A conducting electrode 6 is then deposited. Electrode 6 may comprise aluminium or indium. Finally the device is encapsulated in a moisture-free environment.

The device shown in FIG. 1 can be considered as consisting electrically of 2 layers. The first layer is the zinc sulphide luminescent layer 3 and the second layer is the amorphous chalcogenide layer 4 together with any additional offside layer 5 underlying electrode 6. When a dc voltage is applied the field inside the device is distributed according to the relative conductivity of these 2 layers. Since the conductivity of the chalcogenide layer is greater than that of the zinc sulphide layer the field is greater in the zinc sulphide layer. As the overall applied voltage is increased the electrical breakdown field of the zinc sulphide layer 3 is reached, hot electrons are generated, and impact excitation of luminescence occurs in layer 3 with suitable activators. This voltage corresponds to a threshold voltage of operation $V_T$. At this point the field is clamped in the zinc sulphide layer and any increase in applied voltage increases the field in the amorphous chalcogenide layer 4 until it also experiences electrical or thermal breakdown. This is the upper threshold voltage $V_B$ of the working range of the device.

The above relationship between applied voltage and resulting current across the device is shown in FIG. 2 where the current flow is to a logarithmic scale. The brightness of the device is proportional to current flow so that the ordinate of the graph in FIG. 2 also shows brightness to a logarithmic scale.

An important advantage of the amorphous chalcogenide glass layer 4 is that it forms a black background to the active electroluminescent layer 3 and thus enhances the contrast when the device is in operation and the patterned layer 2 is viewed through the glass base 1.

The device described above may be ac energised by sinusoidal or square wave excitation. Alternatively the device may be dc energised with pulsed or continuous dc excitation.

We claim:

1. An electroluminescent device comprising an active electroluminescent layer having at one surface thereof a transparent patterned electrically conducting layer and at the other surface thereof a resistive backing layer formed of an amorphous chalcogenide glass comprising (a) germanium, arsenic and selenium, (b) germanium, antimony and selenium, or (c) germanium, arsenic, antimony and selenium, said backing layer serving both to electrically stabilize the device and to enhance the optical contrast of the said patterned layer, and an electrode coupled to the backing layer.

2. The device as claimed in claim 1 in which a dielectric layer is interposed between the backing layer and the electrode.

3. The device as claimed in claim 1 in which the said transparent electrically conducting layer is supported on a transparent base so that the pattern can be viewed through the base when the device is energized.

* * * * *